TRANSMITTER FOR A REMOTE SUPERVISORY AND CONTROL SYSTEM

Original Filed June 14, 1951 4 Sheets-Sheet 1

INVENTORS:
JOHN I. BELLAMY
PAUL W. HEMMINGER
BY John I. Bellamy
ATTORNEY

TRANSMITTER FOR A REMOTE SUPERVISORY AND CONTROL SYSTEM

Original Filed June 14, 1951 4 Sheets-Sheet 2

INVENTORS:
JOHN I. BELLAMY
PAUL W. HEMMINGER
BY John I. Bellamy
ATTORNEY

Jan. 3, 1956 J. I. BELLAMY ET AL 2,729,813

TRANSMITTER FOR A REMOTE SUPERVISORY AND CONTROL SYSTEM

Original Filed June 14, 1951 4 Sheets-Sheet 3

INVENTORS:
JOHN I. BELLAMY
PAUL W. HEMMINGER
BY John I. Bellamy
ATTORNEY

TRANSMITTER FOR A REMOTE SUPERVISORY AND CONTROL SYSTEM

Original Filed June 14, 1951 4 Sheets-Sheet 4

SENDER CONTROL RELAYS

INVENTORS:
JOHN I. BELLAMY
PAUL W. HEMMINGER
BY John I. Bellamy
ATTORNEY

United States Patent Office 2,729,813

Patented Jan. 3, 1956

2,729,813

TRANSMITTER FOR A REMOTE SUPERVISORY AND CONTROL SYSTEM

John I. Bellamy, Wheaton, and Paul W. Hemminger, Franklin Park, Ill., assignors, by mesne assignments, to International Telephone and Telegraph Corporation, a corporation of Maryland Original application June 14, 1951, Serial No. 231,584. Divided and this application January 14, 1953, Serial No. 331,234

6 Claims. (Cl. 340—359)

This invention relates to a transmitter for a remote supervisory and control system. Its principal object is to provide an economical and reliable sender or transmitter for responding to the energization of any one of a number of incoming control wires to transmit respectively corresponding two-digit numbers.

This application is a division of our prior application for a remote supervisory and control system Serial No. 231,584, filed June 14, 1951.

A feature concerned with the carrying out of the above noted object resides in an arrangement whereby the control wires incoming to the sender are so arranged that only one such wire can exercise control over the sender at any one time.

A further feature relates to the arrangement for generating successive trains of pulses which are timed as to their pulse duration and the time separation between them, and to an arrangement for providing the required inter-digit interval and inter-number interval.

Other objects and features will become apparent as the description progresses.

*General description*

As disclosed in the noted parent application, the transmitter or sender used in a remote and supervisory control system responds to separate control indications initiated by a control station to transmit two-digit code numbers over a transmission line to a receiver at a remote field station to thereby control items of switching gear. The operation of the sender in responding to such control indications and in exercising control over the reeciver will hereinafter be described in detail.

The accompanying drawings comprising Figs. 1 through 4 disclose a preferred embodiment of the sender and related control apparatus as follows.

Figure 1:
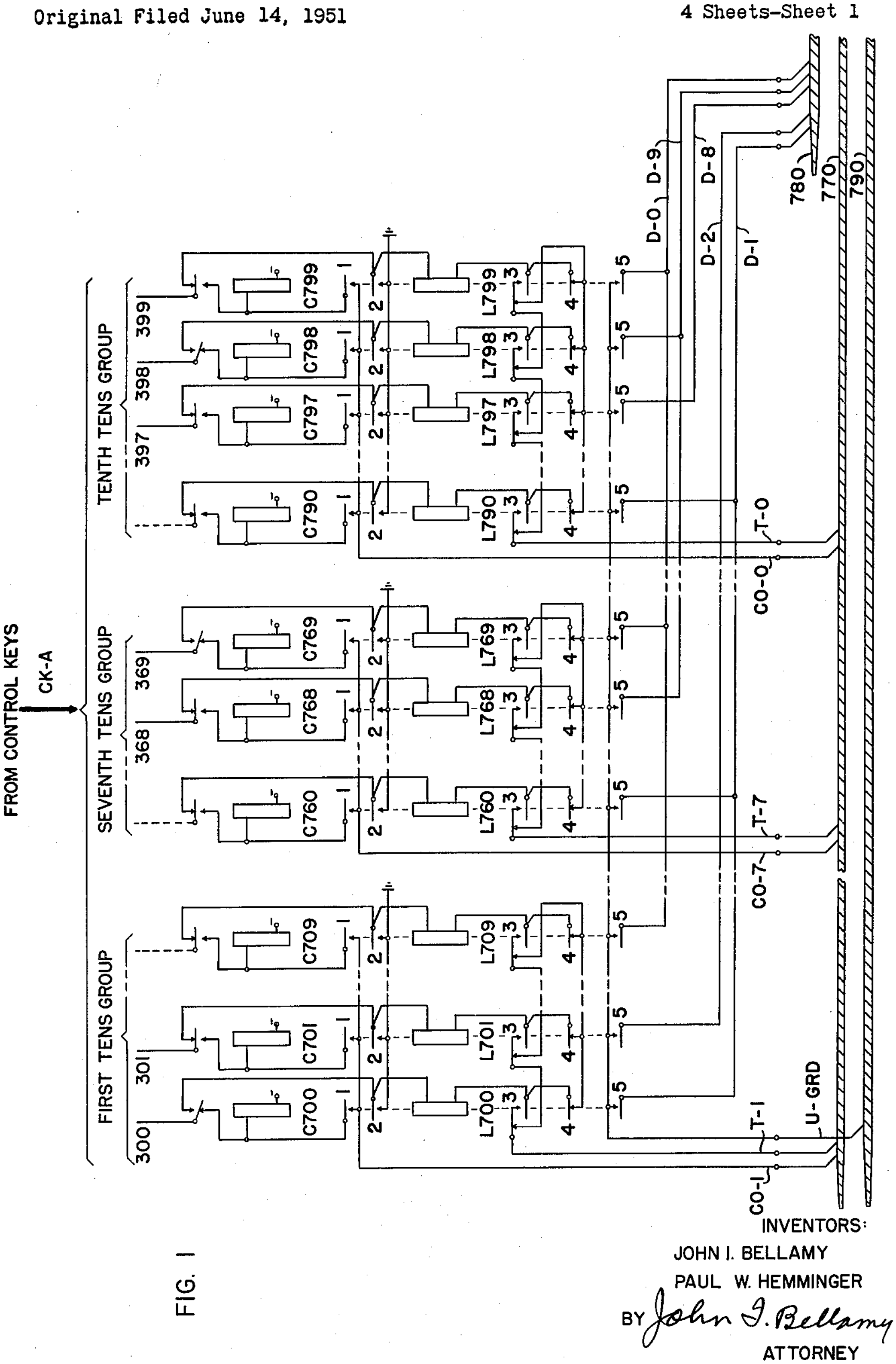
Fig. 1 shows one hundred line and cutoff relays arranged in ten similar groups each comprising ten line and ten cutoff relays. These relays respond to the incoming control indications from the control wires to control the individulization of the sender with any energized wire and to control the sender in transmitting corresponding two-digit numbers.

Referring now to Fig. 1 of the drawings it will be observed that the first, seventh and tenths tens groups are shown. In the first tens group only the first, second, and last line and cutoff relays are shown; in the seventh tens group only the first, ninth, and tenth relay combinations are shown; and in the tenth tens group, only the last three relay combinations are shown.

The contact set of each cutoff relay is connected to a separate one of the control wires 300 to 399 in control cable CK–A extending to the control keys of the noted parent application. Cutoff relay C700 is connected to wire 300, relay C701 is connected to wire 301, relay C768 is connected to wire 368, and so forth.

When the cutoff relays are in their unoperated condition, the associated control wire is connected to the line relay of the concerned relay combination through break contacts on the cutoff relay. Responsive to energization of such control wire, the line relay is operated and individualizes that wire with the sender as will hereinafter be described. After the sender transmits the two-digit number characteristic of the control wire energized, the cutoff relay is operated and the control wire is transferred from the line relay to the cutoff relay to thereby terminate the individualization and release the sender. When the control wire is deenergized the cutoff relay is restored and the control wire is again connected to the line relay.

Figure 4:
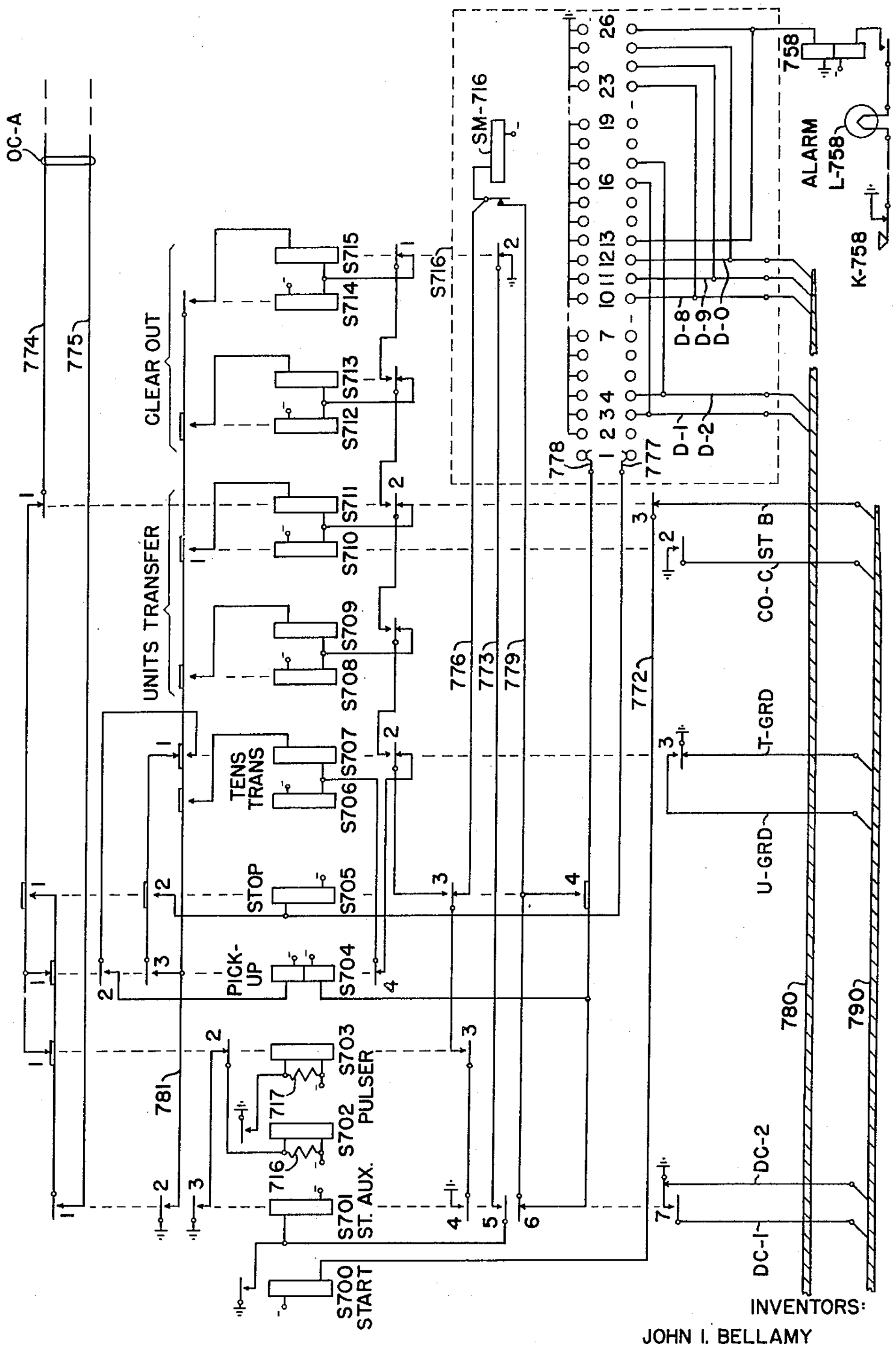
Fig. 4 shows the central control relays S700 to S715 together with sender switch S716. These relays and switch transmit pulses over transmission line OC–A according to the tens and units marked wire.

The line relays mark the individual wires by extending ground potential from units ground wire U–GRD to the associated one of digit wires D1 to D0 extending to the sender switch of Fig. 4 over conductors in cable 780. The line relays also mark the tens group containing the concerned wire by extending the ground potential on the energized control wire to the associated one of the tens wires T–1 to T–0 of cable 770.

Figure 2:
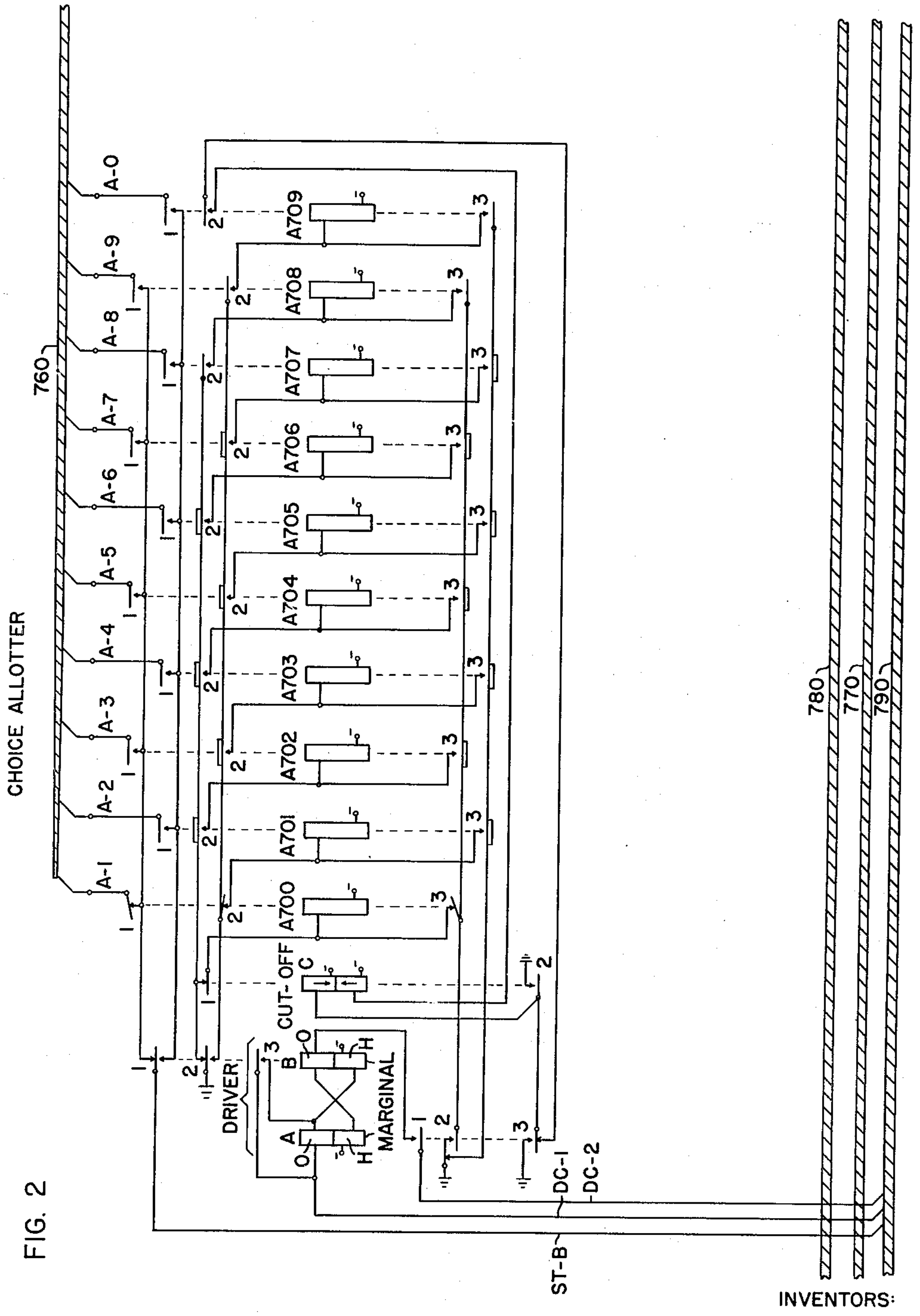
Fig. 2 shows a choice allotter for shifting the first choice successively among the ten groups of line and cutoff relays.

Fig. 2 discloses a choice allotter for shifting the first choice successively among the ten line and cut-off relays of each tens group, as noted. The choice allotter is a specialized counting chain arranged to assume allotting position 1 to 10 successively in cycles. Allotting relays A700 to A709 are controlled by driver relays A and B over odd and even control wires to cause their contacts 1 to shift the start wire ST–B successively among allotter output wires A–1 to A–0. Cutoff relay C is employed to disconnect relay A700 when relay S701 operates, and to hold it disconnected until a new cycle of operations is about to begin. The choice allotter is illustrated in position 1, and the first allotter relay A700 stands operated. The disclosed choice allotter is as shown and described in the Boyer and Bellamy application for an Endless Chain of Counting Relays, Serial No. 134,448, filed December 22, 1949, now Patent No. 2,600,729, issued June 17, 1952.

Figure 3:
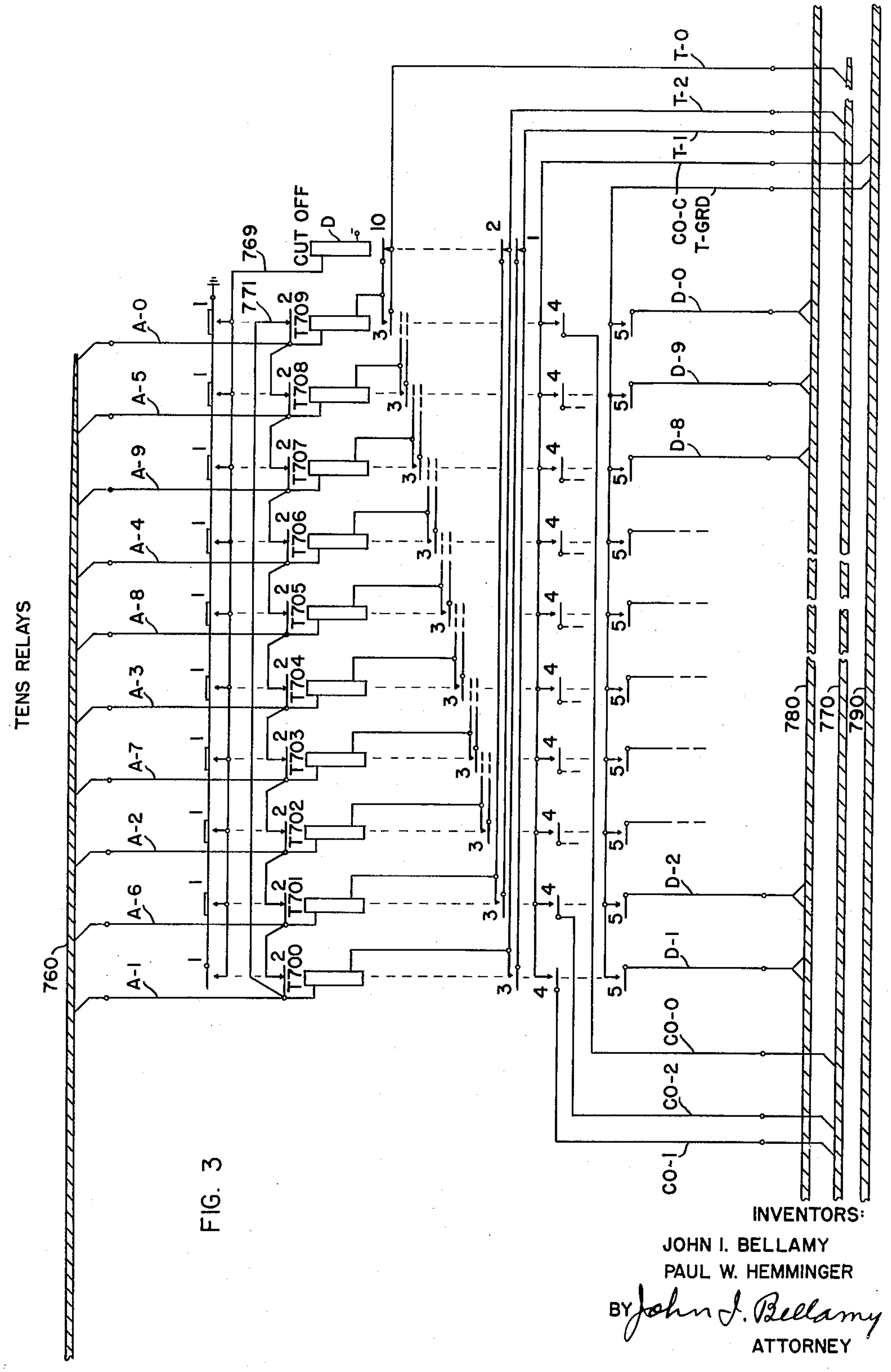
Fig. 3 shows the tens relays and their associated cutoff relay. These relays mark the tens group including the control wire initiating the control over the transmitter, and together with the line relay mark the individual wire in the marked tens group.

Fig. 3, shows the tens relays T700 to T709 and their associated cutoff relay D. Each tens relay is associated with its respective tens group over tens wires T–1 to T–0 of cable 770 and is associated with the choice allotter over wires A–1 to A–0 of cable 760.

The tens relays mark the tens group containing the energized control wire and in conjunction with the line relays of the marked tens group, mark the tens and units location of such energized control wire.

Fig. 4 shows the sender control relays and switch for transmitting pulses constituting two digit numbers over transmission line OC–A according to the marked tens and units wires.

*Detailed description*

As described in the parent application, ground potential is transferred between certain ones of the control wires in cable CK–A by control exercised thereover by control keys (not shown). Assuming such control key operation transfers ground potential from control wire 300 to 301, the operation of the sender in responding to energization of wire 301 will now be described.

The transfer of ground potential from wire 300 to wire 301 restores cutoff relay C700. Contacts on relay C701 extend ground potential from wire 301 to one side of the winding of line relay L701. The other side of the winding of relay L701 is connected to tens wire T–1 through its break contacts 4 and through the series make-before-break contacts 3 of all the line relays in the first tens group.

Tens group wire T–1 is connected to the winding of its associated tens relay T700 over cable 770 and through break contacts of cutoff relay D. The other side of the winding of relay T700 is connected to wire A–1 which extends to the choice allotter over cable 760. This wire extends through make contacts 1 of the operated even-numbered allotter relay (relay A700 illustrated in its operated position) and through back contacts 1 of driver relay B to start wire ST–B which is connected to battery potential through contacts 3 of units transfer relay S711, and the winding of start relay S700.

It is observed then that any line relay associated with the grounded control wire initiating control over the sender is connected in series with the tens relay of the tens group, the concerned line relay, and start relay S700 of the sender control relays. Ground potential appearing on the winding of any line relay causes the concerned line relay, the associated tens relay and the start relay to operate in series.

If two control wires associated with the line and cutoff relays of the same tens group are operated at the same time, the series make-before-break contacts of the line relays give preference to the control wire associated with the lower-numbered line relay. For example, if ground potential is placed on the windings of relays L700 and L709 at the same time, the operation of relay L700 opens the operate path of relay L709, giving relay L700 preference.

If two control wires associated with the line and cutoff relays of any two different tens group are operated at the same time, the tens relays associated with each group both start to operate, but the first such relay in the current order of preference as determined by the choice allotter opens the preference chain (at its break contacts 2) to prevent effective operation of any succeeding one.

Assuming now that relays L701, T700, and S700 operate responsive to the transfer of ground potential from wire 300 to 301, contacts 3 of line relay L701 opens the operate path of all other line relays in the first tens group and at its contacts 2 locks itself operated independent of the ground on wire 301.

Tens relay T700 operates and operates cutoff relay D. Cutoff relay D, at its break contacts 1 to 10 opens the operate circuit of all other tens relays thereby rendering the sender control relays individual to the relays of the first tens group. At its contacts 5, relay T700 extends ground potential from back contacts 3 of relay S707, over tens ground wire T–GRD, and over cable 780 to the digit wire D–1 corresponding to the tens group of line and cutoff relays including the energized control wire 301. This ground potential on digit wire D–1 is extended over conductors in cable 780 to contacts 3 of the lower level of the bank switch S716.

At this time, the sender control relays, performing their respective functions as follows, transmit two-digit numbers characteristic of the control wire grounded.

Start relay S700, being in series with any line relay and its corresponding tens relay, is provided with an auxiliary start relay S701.

Pulser relays S702 and S703 operate successively in cycles to provide the desired time interval of the pulses transmitted as well as to determine the inter-digit and inter-number time intervals.

Pickup relay S704 operates when the first impulse of any digit is transmitted and remains operated during the digit period when pulses are transmitted.

Stop relay S705 operates to terminate the transmission of impulses when the number of impulses in each digit transmitted corresponds to the tens and units location of the marked control key and its marked position.

Tens transfer relays S706 and S707 operate on completion of the transmission of the impulses constituting the tens digit and transfer the digit wire control ground from the tens ground wire T–GRD to the units ground wire U–GRD.

Units transfer relays S708, S709, S710, and S711 operate on completion of the transmission of the impulses constituting the units digit to provide a time interval for operating the cutoff relay associated with the operated line relay.

Clearout relays S712, S713, S714, and S715 operate to clear out the sender equipment and provide switch-through and clear-out time intervals.

Alarm relay 758 operates and furnishes an alarm indication if trouble occurs in the circuits associated with the digits wires.

Start relay S700 operates and operates start auxiliary relay S701. Contacts 1 of relay S701 close the line loop across outgoing transmission line OC–A by connecting wire 774 to wire 775 through break contacts of units transfer relay S711 and through break contacts 1 of relays S703 and S704. At its contacts 2, relay S701 grounds common locking wire 781; at its contacts 5 locks itself operated to ground potential at break contacts 2 of clearout relay S715; and at its contacts 7 extend ground potential to driver control wire DC–1, extending to the driver relays A and B of the choice allotter. The allotter thereby advances to its next position in the manner described in the noted Bellamy and Boyer application. Contacts 6 of relay S701 open the homing circuit of the switch S716 to prevent it from homing as it is advanced from its illustrated position; and contacts 3 extend ground potential to the winding of the first pulser relay S702 through break contacts 2 of the second pulser relay S703.

Ground potential from contacts 3 of relay S701 operates pulser relay S702 which closes an operate circuit for pulser relay S703 at its make contacts. Relay S703 operates and at its contacts 2 opens the operate circuit of relay S702, permitting it to restore.

The restoration of relay S702 opens the operate circuit of relay S703, causing it to restore. When relay S703 restores, it closes the operate circuit for relay S702 again. Therefore, as long as relay S701 remains operated, pulser relays S702 and S703 operate and restore in succession repeatedly serving as a pulse generator as will be described hereinafter. Resistors 716 and 717, in parallel with the windings of relays S702 and S703, respectively, lengthen the normal operate and release time of these relays, providing a timer of variable timing intervals depending on the values of the resistors.

It is assumed that the values of resistors 716 and 717 are such that one cycle of operations of the pulser is completed in 100 milliseconds, that is, pulser relay S703 operates 50 milliseconds after the operation of the first pulser relay S702 and remains operated for 50 milliseconds. The time interval of 50 milliseconds in which relay S703 is operated will be termed the pulse period and the time interval of 50 milliseconds in which relay S703 is restored will be termed the pulse interval.

The closing of the line loop by the operation of relay S701 causes the remotely-located receiver circuit to be seized, as described in the parent application. On the first operation of relay S703, the opening of contacts 1 of relay S703 is ineffective as the line loop is maintained closed by contacts 1 of relay S704. However, on the first operation of relay S703, ground potential is extended through make contacts 3 of relay S703 and break contacts 3 of stop relay S705 to the winding of the stepping magnet SM716, energizing it. As previously pointed out in the parent application, the brushes of switch S716 are only advanced on the back stroke of stepping magnet SM716, hence switch S716 does not advance its brushes during the pulse period.

When relay S703 restores, its contacts 1 maintain wire 774 connected to wire 775 and its contacts 3 remove ground potential from the winding of the stepping magnet SM716, thereby advancing brushes 777 and 778 from their home position 1 to position 2.

Ground potential from contacts 2 of the upper bank of the switch S716 is extended through brush 778 to the lower winding of pick-up relay S704, operating it. Contacts 1 of relay S704 open, leaving the line loop closed by contacts 1 of pulser relay S703, and at its contacts 4, relay S704 opens the operate circuit of tens-transfer relay S706.

The next pulse period of the pulsing relays opens contacts 1 of relay S703 which for the first time opens the line loop across transmission line OC–A, thereby transmitting one impulse thereover. At the same time, contacts 3 of relay S703 extend ground potential to the winding of the stepping magnet again.

The line loop remains open for the pulse period of 50 milliseconds, whereupon it is closed by the restoration of relay S703. With this restoration, stepping magnet SM716 advances the brushes of switch S716 to the next position, position 3.

In position 3, ground potential through brush 778 maintains pickup relay S704 operated and ground potential from the first digit wire D–1 (wire D–1 is grounded since the first tens group includes the concerned control wire) is extended through brush 777 to the winding of stop relay S705, operating it. Contacts 1 of relay S705 short-circuit contacts 1 of relay S703 so that the next operation of the pulser relay S703 will not transmit another pulse; contacts 2 lock relay S705 operated to the common ground wire 781 through make contacts 3 of relay S704 or break contacts 1 of relay S707; contacts 3 open the operate circuit of the stepping magnet SM715 and prepare an operate path for relay S706; and contacts 4 connect brush 778 to wire 779. Ground potential appearing on contacts 3 to 13 of the upper bank of switch S716 is extended over wire 779 to the homing contacts of switch S716 causing it to home by rapidly advancing to position 14. While homing (advancing from position 3 to position 14), relay S705 remains operated through its noted locking contacts 2.

Upon reaching position 14, ground potential is removed from brush 778 and pickup relay S704 restores, closing its contacts 4 in preparation for the operation of tens transfer relay S706. The transmission of the first digit of the two-digit code number is now completed.

Assuming that the homing operation of the switch S716 is not completed before pulse relay S703 operates for the next pulse period, ground potential appears on make contacts 3 of relay S705 through make contacts 3 of relay S703 but relay S706 fails to operate as relay S704 is held operated until the homing operations are completed. This prevents transmission of any false impulses over the transmission line.

Assuming that the homing operation of magnet SM716 is completed before relay S703 operates during the next pulse period, relay S704 is restored as noted, and the operate path of relay S706 is completed through make contact 3 of relay S703. Operation of relay S703 to generate the next pulse period causes ground potential to be extended to the winding of relay S706, operating it. Relay S706 remains operated from the ground potential from contacts 3 of relay S703. Relay S707 does not operate during the pulse period as ground potential from relay S703 is on one side of the winding of relay S707 while ground potential from contacts 2 of relay S701 through contacts of tens transfer relay is on the other side of the winding.

When relay S703 restores after the pulse period, relay S707 operates in series with relay S706, the circuit being to ground potential at contacts 2 of relay S701. Contacts 3 of relay S707 transfer ground potential from wire T–GRD to U–GRD. This transfer removes ground potential from the tens digit wire D–1 and extends it to the units digit wire D–2 (the second line relay being operated) over wire U–GRD in cable 790 and contacts 5 of the operated line relay L701. This ground potential is further extended over digit wire D–2 in cable 780 to contacts 4 of the lower bank of the switch S715. Since the contacts 3 to 12 are multipled to contacts 16 to 25 of the lower bank of switch S716, this ground potential is also placed on contact 17. Contacts 1 of relay S707 open the locking circuit of the stop relay S705, permitting it to restore.

The next operation of relay S703, with relays S704 and S705 restored, extends ground potential to the winding of stepping magnet SM716, energizing it. At this time, the line loop across wires 774 and 775 is closed at contacts 1 of pickup relay S704 to prevent an impulse from being transmitted until the proper inter-digit interval has elapsed.

When relay S703 restores, upon completion of the pulse period, switch S716 advances its brushes 777 and 778 to position 15, whereupon ground potential is extended through brush 778 to the winding of pickup relay S704, operating it. Pickup relay S704 locks through its contacts 2 and the make contacts 1 of operated relay S707 to ground potential at contact 2 of start relay S701.

The next operation of pulser relay S703 opens the line loop across wires 774 and 775 for the time interval of one pulse period. At the same time, its contacts 3 extends ground potential to the winding of the stepping magnet, energizing it.

When relay S703 restores, the line loop is again closed, completing the transmission of the first pulse of the second digit. Its contacts 3 remove ground potential from the winding of magnet SM716, advancing the brushes of switch S716 to position 16. In this position, brush 777 is on the contact associated with digit wire D–1. However, since line relay L701 is operated, ground potential is present on digit wire D–2 only and brush 777 is ineffective.

The next operation of relay S703 opens the line loop again for the second pulse of the second digit and at the same time energizes the winding of the stepping magnet. When the pulse period is completed, switch S716 advances its brushes to position 17 and the line loop is closed at contacts 1 of pulser relay S703, completing the second pulse of the second digit. Ground potential on digit wire D–2 is extended through brush 777 to the winding of stop relay S705, operating it. Relay S705 locks operated through its make contacts 2 and make contacts 3 of pickup relay S704. Contacts 1 of the stop relay prevent the next operation of relay S703 from closing the line loop for the third pulse; contacts 4 connect brush 778 to wire 776 extending to the winding of the stepping magnet through the homing contacts of switch S716; and contacts 3 transfer the magnet operate wire from wire 766 to the winding of units transfer relay S709. Switch S716 homes to its position 1 from the ground potential on contacts 11 to 26. In its home position, both brushes 777 and 778 are ineffective but relay S704 remains operated over its hereinbefore noted locking path.

The next operation of relay S703 extends ground potential to the winding of S708 relay operating it. This ground potential also appears on one side of the winding of relay S709 and ground potential from the common ground wire 781 is present on the other side of the winding, short-circuiting relay S709 and preventing its operation. When relay S703 restores, relay S709 operates in series with relay S708. Contacts of relay S709 prepare an operate path for relay S710.

The next operation and restoration of relay S703 operates relays S710 and S711 in the manner described for relays S708 and S709. When relay S710 operates, its contacts 2 extend ground to cutoff relay control wire CO–C extending to the winding of the cutoff relay associated with the operated line relay. This path includes contacts 4 of the operated tens relay 701, cutoff wire CO–1 of cable 770, and contacts 1 of line relay L701.

Relay C701 operates and locks operated through its make contacts to the ground potential on control wire 301.

When relay S711 operates, its contacts 1 open the line loop across transmission line OC–A thereby releasing the noted receiver in preparation for another call. Its contacts 3 open the operate circuit of the start relay S700, the operated tens relay, and the operated line relay, restoring them.

During the time that relays S708 to S711 are operated by pulser relay S703, the line loop was held closed by stop relay S705 and no pulses were transmitted during this time.

The restoration of start relay S700 opens the operate circuit of start auxiliary relay S701 but relay S701 remains operated over its hereinbefore noted locking circuit. The restoration of tens relay T700 causes marking ground potential to be removed from all digit wires and causes cutoff relay D to restore in preparation for another call. The restoration of line relay L701 closes the make-before-break chain of contacts permitting another call to be made in its tens groups.

The next two pulse cycles (operation and restoration) of pulse relay S702 operates relays S712 and S713 in series and relays S714 and S715 in series in the same manner in which relays S708 and S709 operated.

When relay S715 operates, its contacts 2 open the locking circuit of start auxiliary relay S701, restoring it. The restoration of relay S701 removes ground potential from common ground wire 781, restoring all operated sender control relays, thereby completely clearing out the sender.

Sender SE–700A has responded to the control exercised over it by the energization of a control wire by transmitting a two-digit number over transmission line OC–A, this number corresponding to the energized control wire initiating the call. The transfer of ground potential from wire 300 to wire 301 caused sender SE–700A to transmit the two-digit number "12" to the remotely-located receiver. If ground were transferred from wire 369 to wire 368, the sender SE–700A would transmit the two-digit number "78" as control wire 368 is associated with the next to the last line relay L768 in the seventh line group. In this case, during the operation of the sender control relays, ground potential would first appear on tens digit wire D–7 and then on units digit wire D–8 causing the number "78" to be transmitted. Likewise, if the ground potential was transferred from wire 398 to wire 399, ground potential would appear on digit wires D–0 for both digits (line relay L799 and tens relay T709 operating) and sender SE–700A would transmit the number "00." In all cases, when the sender completed its transmission of numbers, the cutoff relay associated with the control wire initiating the call operates and disassociates the sender equipment from the concerned control wire.

Assuming the pulse cycle time to be 100 milliseconds (one operation and one restoration of relay S703), the remotely-located receiver of the noted parent application is seized for a period of 150 milliseconds before the first pulse is delivered; it is permitted a time interval of 250 milliseconds between digits; and is permitted 200 milliseconds for the switch-through operation. The seizure time is determined by the number of operations of the pulser S703 before pickup relay S704 operates; the inter-digit time is determined by the operation of the tens transfer relays (100 ms.) plus the number of timing cycles before pickup relay S704 operates on the start of the second digit; the switch-through time is determined by the operation of the four units transfer relays; and the clearout time is determined by the operation of the four clearout relays.

Alarm relay 758 provides an alarm indication if for any reason ground potential does not appear on any of the digit wires D–1 to D–0 during the sending operation of the sender. Alarm relay 758 has one side of its upper winding connected to contacts 13 and 26 of the lower level of switch S716 and has the other side connected to ground potential. If stop relay S705 operates from ground potential on any digit wire, when brush 777 reaches position 13 or 26, the locking ground potential on the winding of the stop relay short-circuits alarm relay 758, preventing its operation. However, if stop relay S705 is not operated when brush 777 reaches position 13 or 26, ground potential from the winding of relay 758 operates the stop relay S705 in series with the alarm relay 758. The stop relay locks operated over its hereinbefore noted locking path and the alarm relay locks operated through its lower winding, its locking contacts, alarm lamp L758 and alarm release key K758 to ground potential providing an alarm indication by lighting lamp L758. The alarm lamp may be thereafter extinguished by operating release key K758 to restore relay 758.

After an alarm condition is present, the sender equipment functions normally on other calls as the locking circuit of alarm relay 758 is external to the sender circuit.

We claim:

1. In a remote control system, a sender and a transmission line, means for operating said sender to transmit successive multi-digit numbers over the said line in the form of successive trains of pulses which are timed as to length of pulse and as to separation between pulses, with timed inter-digit and inter-number intervals, each inter-number interval including a timed pulse-off cut-through interval succeeded by a pulse-on clearout time interval and a pulse-off preparatory time interval, a pulse generator and means for operating it to generate a continuous series of pulses timed as to pulse length and inter-pulse interval, digit marking means and means controlled thereby for counting the generated pulses and delivering successive trains of them to the transmission line according to the respective digit values of the numbers to be transmitted, other means operative to count concerned ones of the generated pulses to determine the inter-digit intervals, and still other means operative to count concerned ones of said pulses to determine each of the three said intervals constituting any inter-number interval.

2. In a sender for use in a remote supervisory and control system, separately energizable incoming control lines, an outgoing transmission line, line relays connected respectively to the control lines and operable respectively thereover responsive to energization thereof, means responsive to the said operation of any line relay for closing a low-resistance local circuit for energizing the associated line more strongly, means also responsive to the said operation of any line relay for causing the sender to transmit digit pulses over the transmission line characteristic of the operated line relay and its energized line, cutoff relays associated with the line relays respectively, means responsive to the completion of the said sender operation for operating the cutoff relay associated with the operated line relay, means included in the cutoff relay for disconnecting the energized line from the associated line relay and for transferring it to the associated cutoff relay to hold the latter relay locked operated so long as the transferred line remains energized, the disconnected line relay thereupon restoring.

3. In a sender as set forth in claim 2, a start relay and circuit means for operating it in series with any said line relay to start the sender into its said transmitting operation.

4. In a sender as set forth in claim 2, the said line relays being arranged in groups, the line relays of each group being included in a preference-lockout chain including contacts on each line relay of the group so arranged that operation of one line relay precludes operation of any other line relay in the group, group relays for said groups respectively, and circuit means for energizing any group relay in series with any line relay of the group, and a preference-lockout chain common to the groups and including contacts on each said group relay so arranged that operation of any group relay precludes operation of any other group relay and thereby precludes operation of any line relays in any other group.

5. In a sender as set forth in claim 4, a start relay and circuit means for operating it in series with any operated line relay and associated group relay, and contact means controlled by the start relay to start the sender into its said transmitting operation.

6. In a sender for transmitting successive series of pulses representative of respective digits in multi-digit numbers, a pulse generator, a pulse-operated counting device for controlling the number of transmitted pulses in a series, and a group of relays for controlling the transmission of pulses and the operation of the counting device, said relays including a pickup relay for starting transmission of a series and a stop relay controlled by the counting device to control stopping transmission of the series, tens-transfer counting relays and means for operating them from the pulse generator between series of the same number transmission to control starting of the transmission of the next series at the end of a predetermined inter-digit time interval, a group of units-transfer counting relays and means for operating them from the pulse generator following the last series of a number transmission to provide a pulse-off cut-through interval, and a group of clearout counting relays and means for operating them from the pulse generator following the cut-through interval to provide a pulse-on clearout interval.

References Cited in the file of this patent

UNITED STATES PATENTS

| | | |
|---|---|---|
| 1,846,218 | Lomax | Feb. 23, 1932 |
| 2,042,869 | Smith | June 2, 1936 |